United States Patent
MacNeill

(10) Patent No.: US 9,229,942 B1
(45) Date of Patent: Jan. 5, 2016

(54) METHOD AND SYSTEM FOR HARD LINK HANDLING FOR INCREMENTAL FILE MIGRATION

(71) Applicant: EMC Corporation, Hopkinton, MA (US)

(72) Inventor: Stuart D. MacNeill, South Queensberry (GB)

(73) Assignee: EMC Corporation, Hopkinton, MA (US)

( * ) Notice: Subject to any disclaimer, the term of this patent is extended or adjusted under 35 U.S.C. 154(b) by 35 days.

(21) Appl. No.: 13/710,657

(22) Filed: Dec. 11, 2012

(51) Int. Cl.
*G06F 17/00* (2006.01)
*G06F 17/30* (2006.01)

(52) U.S. Cl.
CPC ................ *G06F 17/30079* (2013.01)

(58) Field of Classification Search
CPC ................ G06F 17/30286; G06F 17/30067; G06F 11/1446
USPC .................. 707/635, 624, 634, 638
See application file for complete search history.

(56) References Cited

U.S. PATENT DOCUMENTS

| | | | | |
|---|---|---|---|---|
| 8,082,227 B2* | 12/2011 | Balakrishnan | ...... | G06F 11/1451 707/640 |
| 8,140,480 B1* | 3/2012 | Tsaur | ................ | G06F 11/1464 707/648 |
| 8,386,924 B2* | 2/2013 | Fitzsimons | ......... | G06F 17/3089 715/235 |
| 2014/0108475 A1* | 4/2014 | Yamada | ............ | G06F 17/30079 707/829 |

* cited by examiner

*Primary Examiner* — Rehana Perveen
*Assistant Examiner* — Loc Tran
(74) *Attorney, Agent, or Firm* — Dergosits & Noah LLP; Todd A. Noah

(57) ABSTRACT

Hard link handling for incremental file migration is described. A file is stored on a storage device. A determination is made whether a path associated with the file is also associated with an index node number in a hard link table. The file is deleted from the storage device if the path associated with the file is also associated with the index node number in the hard link table. The path is linked on the storage device with another file that is associated with another path that is associated with the index node number in the hard link table.

20 Claims, 3 Drawing Sheets

METHOD AND SYSTEM FOR HARD LINK HANDLING FOR INCREMENTAL FILE MIGRATION

BACKGROUND

If a software error corrupts a database, or if erroneous data updates the database, a database administrator may restore the database to a previous uncorrupted state that does not include the erroneous data. A backup application executes a backup operation either occasionally or continuously to enable this restoration, storing each desired database state (the values of its data and these values' embedding in database's data structures) within dedicated backup files. When a database administrator decides to return a database to a previous state, the database administrator specifies the desired previous state by identifying a desired point in time when the database was in this state, and instructs the backup application to execute a restore operation to restore the corresponding backup files for that state to the database.

The standard Network Data Management Protocol (NDMP) provides a mechanism to facilitate file system backup and restore operations between compatible storage devices and backup devices. However, NDMP is unsuitable for heterogeneous backup and restore operations when a backup needs to be created for a source device and stored on a storage device that does not support any of the source device's data formats. NDMP can also be used to provide file and directory migration functionality to copy data from a source device to a storage device by connecting the source device to the storage device, executing a backup operation on the source device, and executing a restore operation on the storage device. Similar to the backup and restore operations using NDMP, this "NDMP copy" process functions properly only if the source and storage devices support at least one compatible data format. NDMP enables an incremental backup by specifying that only files and directories modified after a selected point in time need to be copied from the source device to the storage device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
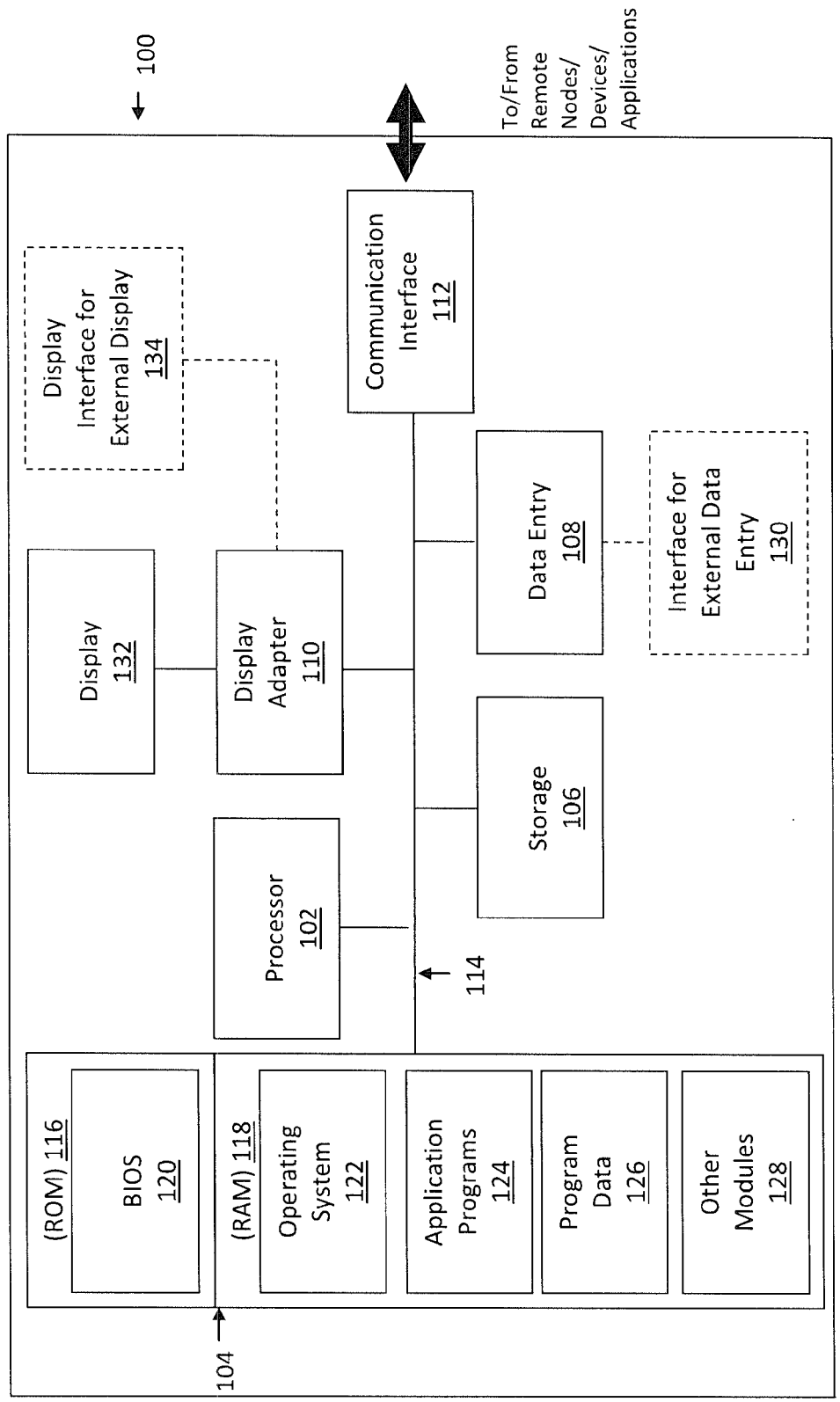
FIG. 1 is a block diagram illustrating an example hardware device in which the subject matter may be implemented.

In the prior art, NDMP does not correctly migrate hard links from a source device to a storage device using the incremental NDMP copy procedure. A hard link is a directory entry that associates a filename, or directory path, with a file in a file system. Hard links allow multiple filenames to be created for the same file. If a file is accessed by one of its multiple filenames and changes are made to the file's content, then these changes will also be accessible when the file is accessed by any of its other filenames that are associated with the file by hard links.

Although NDMP may copy a file associated with multiple hard links using the incremental NDMP copy procedure, the hard links may be broken on the storage device, leading to NDMP creating a duplicate file on the storage device. For example, if a first hard link is associated with a file on a source device, and a second hard link is added and also associated with the file on the source device, an incremental NDMP backup identifies the second hard link as a modification that needs to be updated. Therefore, the incremental NDMP copy procedure results in copying the second hard link and its associated file to the storage device. However, because the incremental NDMP copy procedure cannot determine that the second hard link should be linked to a file that already exists on the storage device, the incremental NDMP copy procedure creates a duplicate of the associated file on the storage device. While the first and second hard links are associated with the same file on the source device, the first and second hard links are each associated with a different copy of the same file on the storage device.

Embodiments herein provide an EMC® cloud tiering appliance that uses NDMP to enable heterogeneous directory and file migration functionality. The cloud tiering appliance functions in the middle of a NDMP copy procedure to perform data format conversions between the source and storage devices. The cloud tiering appliance connects to the source device using NDMP, initiates a backup operation, connects to the storage device using NDMP, and initiates a restore operation. The cloud tiering appliance receives the backup data from the source device, parses the backup data's format, and converts the parsed backup data to a format supported by the storage device. Then the cloud tiering appliance streams the converted backup data to the storage device, where the converted backup data is restored. The cloud tiering appliance may use this process to perform an initial full migration, followed by a number of incremental migrations to migrate any directories or files that are modified since the most recent file migration.

The cloud tiering appliance uses Modes to enable the correct migration of hard links between a source device and a storage device. An Mode, or index node, stores all of the information about a file or a directory, such as ownership, access mode, and type, but not data content, name, or location in a file system. Since each file is associated with its own inode, all of the hard links that are associated with the same file are also associated with the same inode, which is identified by an integer number, often referred to as an inode number.

The cloud tiering appliance uses NDMP to facilitate the correct incremental migration of file and directory data between source and storage devices. After the cloud tiering appliance uses NDMP to store a file on a storage device, the cloud tiering appliance may update a hard link table for any files in the source device that are associated with multiple hard links. For example, after creating the duplicate file on the storage device, the cloud tiering device stores entries for the first hard link and the second hard link that are associated with the same file in the source device into a hard link table and also stores their corresponding Mode number in the source device into the hard link table. Next, the cloud tiering appliance determines whether a path associated with the file stored on the storage device is also associated with an Mode number in a hard link table. For example, the cloud tiering device determines whether the path for the second hard link for the file stored in the storage device is associated with an Mode number in the hard link table. The cloud tiering appliance deletes the file from the storage device if the path associated with the file stored in the storage device is also associated with an Mode number in the hard link table. For example, the cloud tiering device deletes the duplicate file in the storage device because the path that is associated with the duplicate file in the storage device is also associated with an Mode number in the hard link table. The cloud tiering appliance links the path in the storage device with another file. For example, the cloud tiering device links the path for the second hard link to the original copy in the storage device of the file that had been duplicated in the storage device. The cloud tiering appliance enables correct migration of hard links between source and storage devices and uses NDMP to facilitate the incremental migration of file and directory data between source and storage devices of different types that support incompatible data formats.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for hard link handling for incremental file migration.

In the prior art, NDMP does not function properly if the source and storage devices support incompatible data formats, and NDMP does not correctly migrate hard links from a source device to a storage device using the incremental NDMP copy procedure. Embodiments herein enable correct migration of hard links between source and storage devices and use NDMP to facilitate the incremental migration of file and directory data between source and storage devices of different types that support incompatible data formats.

Figure 2:
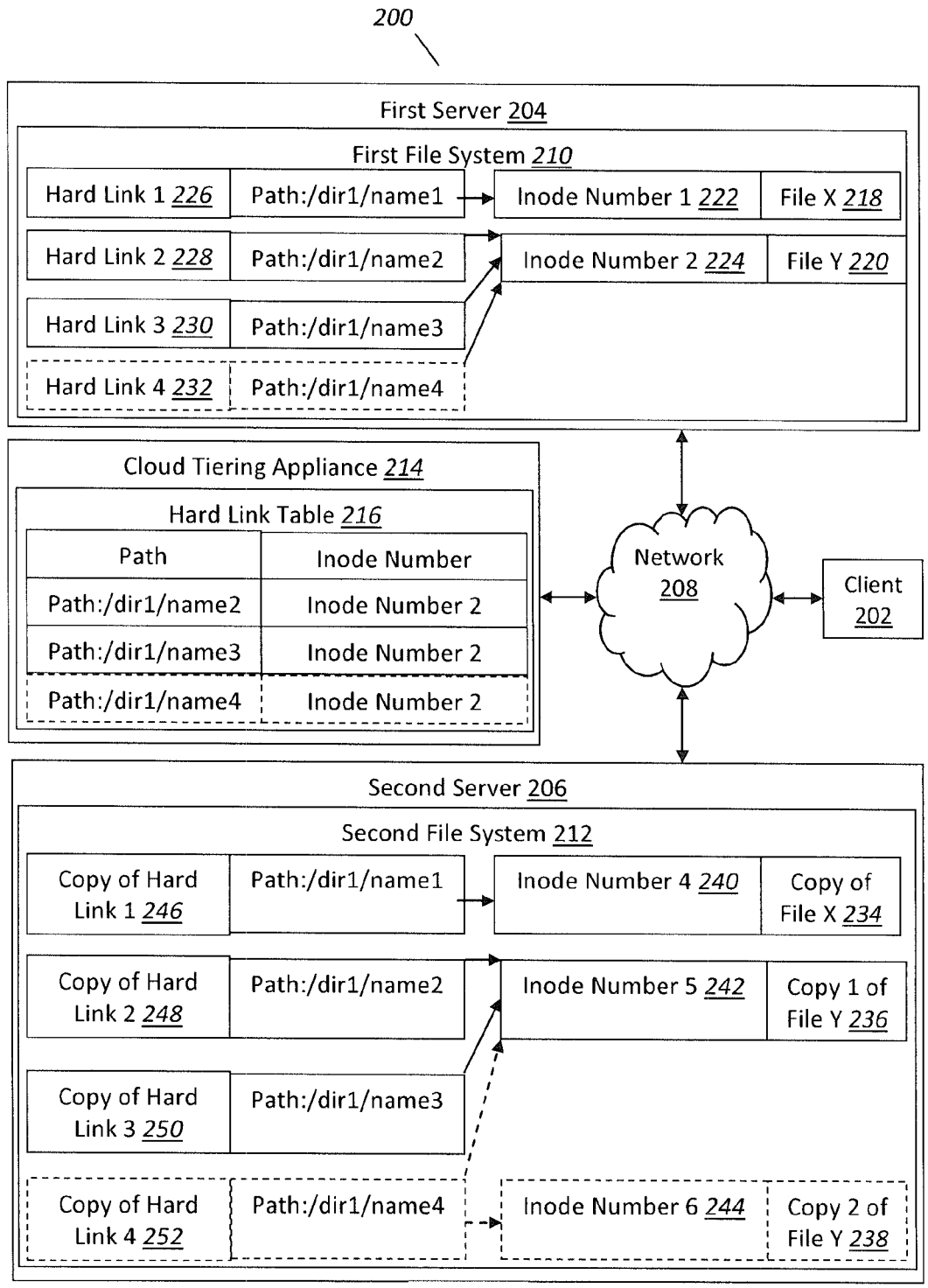
FIG. 2 illustrates a block diagram of an example system for hard link handling for incremental file migration, under an embodiment.

FIG. 2 illustrates a block diagram of a system that implements hard link handling for incremental file migration, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204 and a second server 206 that are provided by a hosting company. The client 202 and the servers 204-206 communicate via a network 208. The first server 204 includes a first file system 210, while the second server 206 includes a second file system 212. The first server 204 migrate files to the second server 206 via a cloud tiering appliance 214. The cloud tiering appliance 214 includes a hard link table 216. Although FIG. 2 depicts the system 200 with one client 202, two servers 204-206, one network 208, two file systems 210-212, one cloud tiering appliance 214, and one hard link table 216, the system 200 may include any number of clients 202, servers 204-206, networks 208, file systems 210-212, cloud tiering appliances 214, and hard link tables 216. The client 202 and the servers 204-206 may each be substantially similar to the system 100 depicted in FIG. 1.

FIG. 2 depicts an example of directories and files that are initially stored in the first file system 210 by the first server 204, migrated via the cloud tiering appliance 214 to be stored in the second file system 212 by the second server 206, and stored in the second file system 212 by the second server 206 as a backup copy of the first file system 210. The first file system 210 includes a file X 218 and a file Y 220. The file X 218 is uniquely identified within the first file system 210 by the Mode number 1 222, and the file Y 220 is uniquely identified within the first file system 210 by the Mode number 2 224. The file system 210 also includes a hard link 1 226, a hard link 2 228, a hard link 3 230, and a hard link 4 232. Each of the hard links 226-232 has an associated path that indicates the corresponding hard link's location within a hierarchical directory tree structure. The hard link 1 226 has the associated path /dir1/name1, the hard link 2 228 has the associated path /dir1/name2, the hard link 3 230 has the associated path /dir1/name3, and the hard link 4 232 has the associated path /dir1/name4. Each of the hard links 226-232 maintains a path value and a reference to one of the files 218-220 in the first file system 210. The hard link 1 226 references the file X 218 via the Mode number 1 222, the hard link 2 228 references the file Y 220 via the Mode number 2 224, the hard link 3 230 also references the file Y 220 via the Mode number 2 224, and the hard link 4 232 additionally references the file Y 220 via the inode number 2 224. FIG. 2 illustrates the later addition of the hard link 4 232 and its path /dir1/name4 by using (lashed lines to depict the outlines of the hard link 4 232 and its path /dir1/name4.

The cloud tiering appliance 214 maintains the hard link table 216 during the process of incremental file migration from the first file system 210 to the second file system 212. The hard link table 216 may include the paths /dir1/name2, /dir1/name3, and /dir1/name4, as well as their corresponding inode numbers, which is the same inode number 2 for each path in this example. FIG. 2 illustrates the later addition of the path /dir1/name4 by using dashed lines to depict the outlines of the path /dir1/name4 and its corresponding Mode number.

The objective of the initial full file migration performed by the cloud tiering appliance 214 is to copy the various hard links, paths and files present within the first file system 210 into the second file system 212. In the first, or baseline, phase of the initial full file migration, the cloud tiering appliance 214 opens an NDMP connection to the first server 204 and instructs the first server 204 to perform an NDMP backup operation which streams the contents of the first file system 210 over the NDMP connection. Then the cloud tiering appliance 214 opens an NDMP connection to the second server 206 and instructs the second server 206 to perform an NDMP restore operation. The cloud tiering appliance 214 then streams the data received from the backup operation into the connection with the second server 206. The second server 206 consumes this data stream and creates copies of the files, paths, and hard links in the second file system 212, thereby copying the contents of the first file system 210 into the second file system 212.

The second file system 212 includes a copy of file X 234, a copy 1 of file Y 236, and a superfluous copy 2 of file Y 238. The copy of file X 234 is uniquely identified within the second file system 212 by the Mode number 4 240, the copy 1 of file Y 236 is uniquely identified within the second file system 212 by the Mode number 5 242, and the superfluous copy 2 of file Y 238 is uniquely identified within the second file system 212 by the Mode number 6 244. Although the copies of files 234-238 stored in the second file system 212 are identical to their corresponding files 218-220 stored in the first file system 210, the Mode numbers 240-244 stored in the second file system 212 are not identical to the Mode numbers 222-224 stored in the first file system 210. The second file system 212 cannot store the same Mode values that are received from the first file system 210 via a NDMP stream because the second file system 212 may have already allocated these Mode values to other files (not depicted in FIG. 2) stored by the second file system 212. Therefore, while the file X 218 is uniquely identified within the first file system 210 by the inode number 1 222, which has the Mode value of 1, the copy of file X 234 is uniquely identified within the second file system 212 by the Mode number 4 240, which has the Mode value of 4, not the Mode value 1 based on a copy of the inode value 1.

The second file system 212 also includes a copy of hard link 1 246, a copy of hard link 2 248, a copy of hard link 3 250, and a copy of hard link 4 252. The copy of hard link 1 246 has the same associated path /dir1/name1 as the hard link 1 226, the copy of hard link 2 248 has the same associated path /dir1/name2 as the hard link 2 228, the copy of hard link 3 250 has the same associated path /dir1/name3 as the hard link 3 230, and the copy of hard link 4 252 has the same associated path /dir1/name4 as the hard link 4 232. Each of the copies of hard links 246-252 maintains a path value and a reference to one of the copies of files 234-238 in the second file system 212. The copy of hard link 1 246 references the copy of file X 234 via the Mode number 4 240, the copy of hard link 2 248 references the copy 1 of file Y 236 via the Mode number 5 242, the copy of hard link 3 250 also references the copy 1 of file Y 236 via the Mode number 5 242, and the copy of hard link 4 252 initially references the superfluous copy 2 of file Y 238 via the Mode number 6 244. FIG. 2 illustrates the later addition of the copy of hard link 4 252, the path /dir1/name4, the Mode number 6 244, and the superfluous copy 2 of file Y 238 by using dashed lines to depict the outlines of the copy of hard link 4 252, the path /dir1/name4, the Mode number 6 244, and the superfluous copy 2 of file Y 238.

At some point in time after the completion of the baseline full file migration, the client 202 adds the hard link 4 232, which has the path /dir1/name4, to reference the file Y 220 via the Mode number 2 224 in the first file system 210. FIG. 2 illustrates the later addition of the hard link 4 232 and the path /dir1/name4 to the first file system 210 by using dashed lines to depict the outlines of the hard link 4 232 and the path /dir1/name4. Subsequently, the incremental NDMP copy procedure creates the superfluous copy 2 of file Y 238 on the second file system 212 because the incremental NDMP copy procedure cannot determine that the copy of hard link 4 252 should be linked to the copy 1 of file Y 236 that already exists in the second file system 212. While the three hard links 228-232 are associated with the same file Y 220 in the first file system 210, the three copies of hard links 248-252 are each associated with the different copies of file Y 236-238 in the second file system 212.

Although the existence of a single superfluous file in this simple and limited example may not appear to create a significant problem, incrementally migrating millions of files over an extended period of time may result in thousands of large superfluous files due to hundreds of hard links that are not handled correctly. Using such a resulting backup copy to restore a file system would waste additional resources to migrate the thousands of large superfluous files back to the source device, and waste much of the source device's storage through the storing of the thousands of large superfluous files. Thousands of large superfluous files may also create confusion among a source system user who modifies what is supposed to be a single version of a file by accessing any of the multiple hard links that are supposed to be associated with the file, erroneously expecting the modification to be accessible via the other hard links that are supposed to be associated with the file.

The functioning of the cloud tiering appliance 214 is illustrated in the following examples for a situation when the hard link 4 232 has been added to the first file system 210 and associated with the file Y 220 after the most recent incremental file migration for creating a backup of the first file system 210. The cloud tiering appliance 214 connects to a source device via NDMP to initiate a ND MP backup operation and receive a file from the source device. For example, the cloud tiering appliance 214 connects to the first server 204 via NDMP, initiates a NDMP backup operation, and receives copies of the hard link 4 232, the path /dir1/name4, the Mode number 2 224, and the file Y 220 from the first file system 210.

If the source device and the storage device support incompatible data formats, the cloud tiering appliance 214 parses the data in the multiple files and converts the data to a data format that is supported by the storage device. For example, the cloud tiering appliance 214 parses the data for the hard link 4 232, the path /dir1/name4, the Mode number 2 224, and the file Y 218, and converts this data from a data format supported by the first server 204 to another data format supported by the second server 206. The cloud tiering appliance 214 is configured prior to file migration to specify the data formats used by the source device and the storage device. The cloud tiering appliance 214 may be modified to have the capability to convert the parsed data from any data format to any other data format.

The cloud tiering appliance 214 connects to a storage device via NDMP to initiate a NDMP restore operation, and stores a file on the storage device. For example, the cloud tiering appliance 214 connects to the second server 206 via NDMP, initiates a NDMP restore operation, and stores the copy of hard link 4 252, the path /dir1/name4, the Mode number 6 244, and the superfluous copy 2 of file Y 238 in the second file system 212. The cloud tiering appliance 214 stores the superfluous copy 2 of file Y 238 in the second file system 212 because the first file system 210 indicated that the hard link 4 252 was modified when the hard link 4 252 was added, and a copy of a file is migrated and stored for each modified hard link.

The cloud tiering appliance 214 may store a path associated with a file stored in the storage device and an index node number associated with the path stored in the storage device into a hard link table for another file that is associated with the path associated with the file stored in the storage device and associated with another path in a source device. For example, the cloud tiering appliance 214 previously stored the paths /dir1/name2 and /dir1/name3 with their associated inode numbers, which are the same inode number 2 in this example, in the hard link table 216. Subsequent to the incremental NDMP copy procedure, the cloud tiering appliance 214 stores the path /dir1/name4 with its associated inode number, the inode number 2, in the hard link table 216. The cloud tiering appliance 214 updates the hard link table 216 in this way because the path /dir1/name4 is associated with the same inode number 2 as the path /dir1/name2 and the path /dir1/name3 in the first file system 210, which indicates that the hard links 228-232 associated with these paths are all associated with the same file Y 218 that is associated with the same inode number 2. In this manner, the cloud tiering appliance 214 maintains the hard link table 216 during the process of incremental file migration from the first file system 210 to the second file system 212.

The cloud tiering appliance 214 determines whether a path associated with a file recently stored in a storage device is also associated with an inode number in a hard link table. For example, the cloud tiering appliance 214 determines whether the path /dir1/name4 that is associated with the superfluous copy 2 of file Y 238 is also associated with an inode number in the hard link table 216. If the path /dir1/name4 is associated with an inode number in the hard link table 216, the cloud tiering appliance 214 should have linked the copy of hard link 4 252 associated with the path /dir1/name4 to a pre-existing file in the second file system 212 instead of creating the superfluous copy 2 of file Y 238 for the copy of hard link 4 252 associated with the path /dir1/name4. If a path associated with the file stored in a storage device is also associated with an inode number in a hard link table, the cloud tiering appliance 214 has to handle hard links for the incremental file migration. If a path associated with the file stored in a storage device is not associated with an inode number in a hard link table, the cloud tiering appliance 214 does not have any hard links to handle for the incremental file migration.

The cloud tiering appliance 214 deletes the file stored in a storage device from the storage device. For example, the cloud tiering appliance 214 deletes the superfluous copy 2 of file Y 240 from the second file system 212 because the hard link table 216 includes the path /dir1/name4 that is associated with the superfluous copy 2 of file Y 240. The inclusion of the path /dir1/name4 in the hard link table 216 indicates that the cloud tiering appliance 214 should have linked the copy of hard link 4 252 associated with the path /dir1/name4 to a pre-existing file in the second file system 212 instead of creating the superfluous copy 2 of file Y 238 for the copy of hard link 4 252 associated with the path /dir1/name4. The cloud tiering appliance 214 quickly identifies the path linked to the file just stored in the second file system 212 and quickly references the corresponding inode number in the hard link table 216 which identify the path, and therefore the file just stored, rather than comparing the copy of every file just stored in the second file system 212 to every other file just stored in the second file system 212, a comparison which could consume a significant amount of time and resources. The copy 1 of file Y 236 remains in the second file system 212 after the cloud tiering appliance 214 deletes the superfluous copy 2 of file Y 238 from the second file system 212.

The cloud tiering appliance 214 links a path with another file that is associated with another path that is associated with an inode number in a hard link table. For example, the cloud tiering appliance 214 links the path /dir1/name4, which is associated with the copy of hard link 4 252, with the copy 1 of file Y 236 because the copy 1 of file Y 236 that is associated with the path /dir1/name3 that is associated with the same inode number 2 that is associated with the path /dir1/name4 in the hard link table 216. FIG. 2 illustrates the later linking of the copy of hard link 4 252 and the path /dir1/name4 to the inode number 5 242 and the copy 1 of file Y 236 by using a dashed line to depict the link between the path /dir1/name4 and the inode number 5 242. This linking reestablishes the three copies of hard links in the storage device associated with the original copy of file Y in the storage device, which results in the copies of the files, paths, hard links, and Modes stored in the second file system 212 matching the files, paths, hard links, and Modes stored in the first file system 210. The cloud tiering appliance 214 enables correct migration of hard links between the first server 204 and the second server 206, and uses NDMP to facilitate the incremental migration of file and directory data between the first server 204 and the second server 206 even if the first server 204 and the second server 206 support incompatible data formats.

Figure 3:
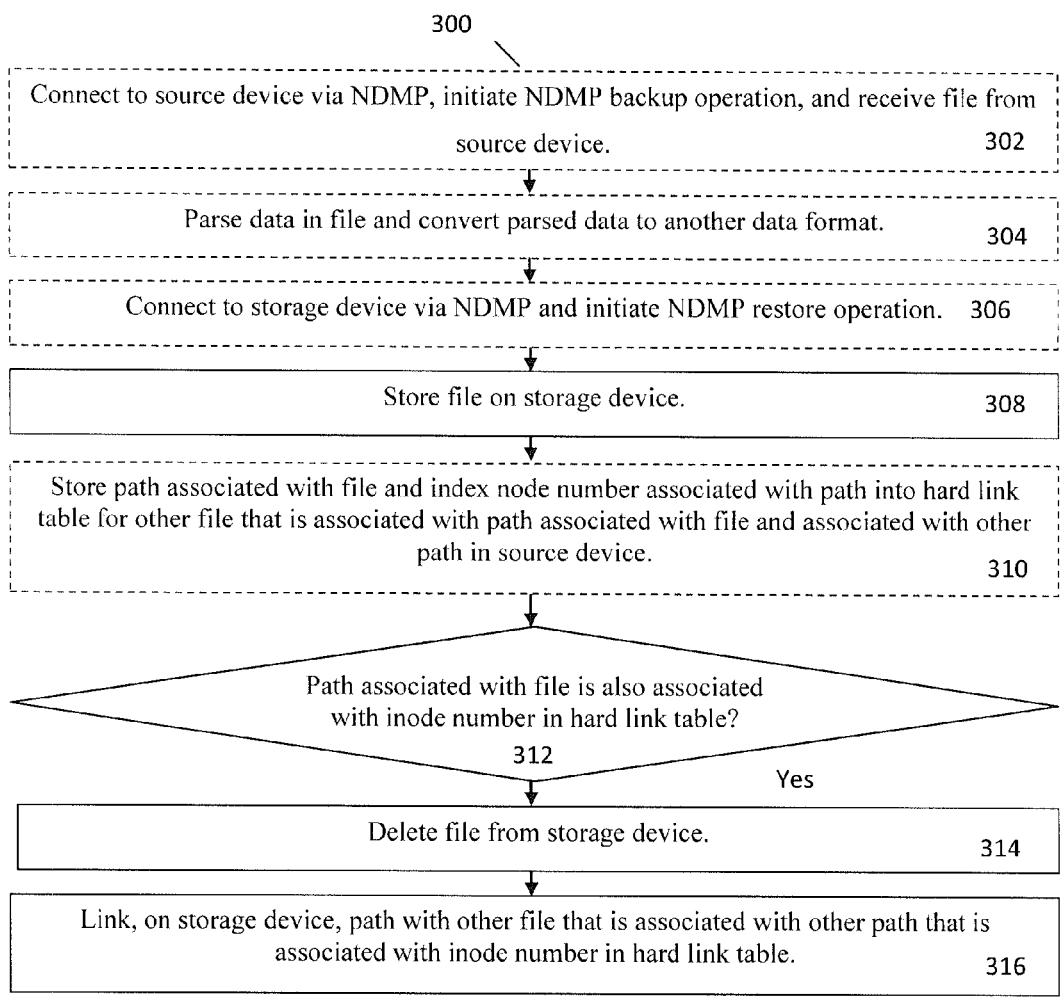
FIG. 3 is a flowchart that illustrates a method of hard link handling for incremental file migration, under an embodiment.

FIG. 3 is a flowchart that illustrates a method of hard link handling for incremental file migration. Flowchart 300 illustrates method acts illustrated as flowchart blocks for certain steps involved in and/or between the client 202 and/or the servers 204-206 of FIG. 2.

A source device is optionally connected via NDMP to initiate a NDMP backup operation and optionally receives multiple files from a source device, act 302. For example, the cloud tiering appliance 214 connects to the first server 204 via NDMP, initiates a NDMP backup operation, and receives copies of the hard link 4 232, the path /dir1/name4, the Mode number 2 224, and the file Y 218 from the first file system 210.

Data in a file is optionally parsed and optionally converted to another data format, act 304. For example, the cloud tiering appliance 214 parses the data in copies of the hard link 4 232, the path /dir1/name4, the Mode number 2 224, and the file Y 218, and converts this data from a data format supported by the first server 204 to another data format supported by the second server 206.

A storage device is optionally connected via NDMP to initiate a NDMP restore operation, act 306. For example, the cloud tiering appliance 214 connects to the second server 206 via NDMP and initiates a NDMP restore operation.

A file is stored on a storage device, act 308. For example, the cloud tiering appliance 214 stores the superfluous copy 2 of the file Y 238 in the second file system 212.

A path associated with a file stored on a storage device and an index node number associated with the path is stored into a hard link table for another file that is associated with the path associated with the file stored in the storage device and associated with another path in a source device, act 310. For example, the cloud tiering appliance 214 stores the path /dir1/name4 with its associated inode number, the Mode number 2, in the hard link table 216.

A determination is made whether a path associated with a file stored to a storage device is also associated with an Mode number in a hard link table, act 312. For example, the cloud tiering appliance 214 determines whether the path /dir1/name4 that is associated with the superfluous copy 2 of file Y 238 is also associated with an Mode number in the hard link table 216. If a path associated with a file stored to a storage device is also associated with an Mode number in a hard link table, the flowchart 300 continues to act 314. If a path associated with a file stored to a storage device is not associated with an Mode number in a hard link table, the flowchart 300 terminates.

A file is deleted from a storage device, act 314. For example, the cloud tiering appliance 214 deletes the superfluous copy 2 of file Y 238 from the second file system 212.

A path is linked on a storage device with another file that is associated with another path that is associated with an Mode number in a hard link table, act 316. For example, the cloud tiering appliance 214 links the path /dir1/name4, which is associated with the copy of hard link 4 252, to the copy 1 of file Y 238 via the Mode number 5 242 in the second file system 212.

Although FIG. 3 depicts the acts 302-316 occurring in a specific order, the acts 302-316 may occur in another order. Embodiments herein enable the correct migration of hard links between the first server 204 and the second server 206, and use NDMP to facilitate the incremental migration of file and directory data between the first server 204 and the second server 206 even if the first server 204 and the second server 206 support incompatible data formats.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for hard link handling for incremental file migration from a first server to a second server, the system comprising:
   one or more processors; and
   a non-transitory computer readable medium storing a plurality of instructions, which
   when executed, cause the one or more processors to:
   store a first file received from the first server on a storage device coupled to the second server;
   store an identical copy of the first file received from the first server on the storage device coupled to the second server;
   determine whether an index node number corresponding to a first path associated with the stored identical copy of the first file is the same as one of a set of index node numbers in a hard link table;
   delete, from the storage device coupled to the second server, the identical copy of the first file when the index node number corresponding to the first path associated with the stored identical copy of the first file is determined to be the same as one of the set of index node numbers in the hard link table; and
   link, on the storage device of the second server, the first path to the first file stored on the storage device coupled to the second server that is associated with the same one of the set of index node numbers in the hard link table.

2. The system of claim 1, wherein the first file comprises a file that was modified in a source device coupled to the first server after a previous file was received to be stored on the storage device coupled to the second server.

3. The system of claim 1, wherein the first path is associated with the first file via a hard link.

4. The system of claim 1, wherein the instructions, when executed, further cause the one or more processors to receive the first file from a source device coupled to the first server.

5. The system of claim 1, wherein the instructions, when executed, further cause the one or more processors to store the first path associated with the first file and the index node number corresponding to the first path into the hard link table for another file that is associated with the first path associated with the first file and associated with another path in a source device coupled to the first server.

6. The system of claim 1, wherein the instructions, when executed, further cause the one or more processors to connect to a source device coupled to the first server via a Network Data Management Protocol, initiate a Network Data Management Protocol backup operation, connect to the storage device coupled to the second server via the Network Data Management Protocol, and initiate a Network Data Management Protocol restore operation.

7. The system of claim 1, further comprising a cloud tiering device configured to receive the first file in a first data format from a source device, parse the data in the first file, convert the parsed data to a second data format, and output the converted parsed data in the second data format to the storage device coupled to the second server, wherein the first data format is incompatible with the second data format.

8. A computer-implemented method for hard link handling for incremental file migration from a first server to a second server, the method comprising:
- storing a first file received from the first server on a storage device coupled to the second server;
- storing an identical copy of the first file received from the first server on the storage device coupled to the second server;
- determining whether an index node number corresponding to a first path associated with the stored identical copy of the first file is the same as one of a set of index node numbers in a hard link table;
- deleting, from the storage device coupled to the second server, the identical copy of the first file when the index node number corresponding to the first path associated with the identical copy of the first file is determined to be the same as one of the set of index node numbers in the hard link table; and
- linking, on the storage device of the second server, the first path to the first file stored on the storage device coupled to the second server that is associated with the same one of the set of index node numbers in the hard link table.

9. The computer-implemented method of claim 8, wherein the first file comprises a file that was modified in a source device coupled to the first server after a previous file was received to be stored on the storage device coupled to the second server.

10. The computer-implemented method of claim 8, wherein the first path is associated with the first file via a hard link.

11. The computer-implemented method of claim 8, further comprising receiving the first file from a source device coupled to the first server.

12. The computer-implemented method of claim 8, further comprising storing the first path associated with the first file and the index node number corresponding to the first path into the hard link table for another file that is associated with the first path associated with the first file and associated with another path in a source device coupled to the first server.

13. The computer-implemented method of claim 8, further comprising:
- connecting to a source device coupled to the first server via a Network Data Management Protocol;
- initiating a Network Data Management Protocol backup operation;
- connecting to the storage device coupled to the second server via the Network Data Management Protocol; and
- initiating a Network Data Management Protocol restore operation.

14. The computer-implemented method of claim 8, further comprising:
- receiving the first file in a first data format from a source device;
- parsing the data in the first file;
- converting the parsed data to a second data format; and
- outputting the converted parsed data in the second data format to the storage device coupled to the second server, wherein the first data format is incompatible with the second data format.

15. A computer program product, comprising a non-transitory computer-readable medium having a computer-readable program code embodied therein to be executed by one or more processors, the program code including instructions to:
- store a first file received from the first server on a storage device coupled to the second server;
- store an identical copy of the first file received from the first server on the storage device coupled to the second server;
- determine whether an index node number corresponding to a first path associated with the stored identical copy of the first file is the same as one of a set of index node numbers in a hard link table;
- delete, from the storage device coupled to the second server, the identical copy of the first file when the index node number corresponding to the first path associated with the stored identical copy of the first file is determined to be the same as one of the set of index node numbers in the hard link table; and
- link, on the storage device of the second server, the first path to the first file stored on the storage device coupled to the second server that is associated with the same one of the set of index node numbers in the hard link table.

16. The computer program product of claim 15, wherein the first file comprises a file that was modified in a source device coupled to the first server after a previous file was received to be stored on the storage device coupled to the second server, and wherein the first path is associated with the first file via a hard link.

17. The computer program product of claim 15, the program code includes further instructions to receive the first file from a source device coupled to the first server.

18. The computer program product of claim 15, the program code includes further instructions to store the first path associated with the first file and the index node number corresponding to the first path into the hard link table for another file that is associated with the first path associated with the first file and associated with another path in a source device coupled to the first server.

19. The computer program product of claim 15, the program code includes further instructions to:
- connect to a source device coupled to the first server via a Network Data Management Protocol;
- initiate a Network Data Management Protocol backup operation;
- connect to the storage device coupled to the second server via the Network Data Management Protocol; and
- initiate a Network Data Management Protocol restore operation.

20. The computer program product of claim 15, the program code includes further instructions to:
- receive the first file in a first data format from a source device;
- parse the data in the first file;
- convert the parsed data to a second data format; and
- output the converted parsed data in the second data format to the storage device coupled to the second server, wherein the first data format is incompatible with the second data format.

* * * * *